United States Patent
Ye et al.

(10) Patent No.: US 11,865,636 B2
(45) Date of Patent: Jan. 9, 2024

(54) SYSTEMS AND METHODS FOR LASER PROCESSING OF SOLID-STATE BATTERIES

(71) Applicant: Lawrence Livermore National Security, LLC, Livermore, CA (US)

(72) Inventors: Jianchao Ye, Tracy, CA (US); John Roehling, Livermore, CA (US); Jae Hyuck Yoo, Dublin, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 546 days.

(21) Appl. No.: 16/783,910

(22) Filed: Feb. 6, 2020

(65) Prior Publication Data

US 2021/0245296 A1    Aug. 12, 2021

(51) Int. Cl.
| | |
|---|---|
| B23K 26/0622 | (2014.01) |
| H01M 8/124 | (2016.01) |
| H01S 3/102 | (2006.01) |
| B23K 103/00 | (2006.01) |

(52) U.S. Cl.
CPC ......... *B23K 26/0622* (2015.10); *H01M 8/124* (2013.01); *B23K 2103/52* (2018.08); *H01S 3/1024* (2013.01)

(58) Field of Classification Search
CPC .............. H01M 8/124; B23K 26/0622; B23K 2103/52; H01S 3/1024
USPC ........................................................ 372/25
See application file for complete search history.

(56) References Cited

U.S. PATENT DOCUMENTS

| | | | | |
|---|---|---|---|---|
| 2007/0105395 A1* | 5/2007 | Kinzel | ...................... | H05K 3/02 438/758 |
| 2010/0035375 A1* | 2/2010 | Grigoropoulos | ...... | H01L 21/288 977/773 |
| 2017/0306474 A1* | 10/2017 | Kwak | ................... | H01M 4/485 |
| 2019/0044186 A1* | 2/2019 | Kim | ................... | H01M 50/403 |
| 2019/0389776 A1* | 12/2019 | Villalobos | ............. | C04B 41/009 |

FOREIGN PATENT DOCUMENTS

CN          108070375 A  *  5/2018

OTHER PUBLICATIONS

L. Fan, S.Y. Wei, S.Y. Li, Q. Li, Y.Y. Lu, Recent Progress of the Solid-State Electrolytes for High-Energy Metal-Based Batteries, Advanced Energy Materials 8(11) (2018) 1702657.
E. Yi, W. Wang, J. Kieffer, R.M. Laine, Key parameters governing the densification of cubic-Li 7 La 3 Zr 2 O 12 Li+ conductors, Journal of Power Sources 352 (2017) 156-164.

(Continued)

*Primary Examiner* — Tu B Hoang
*Assistant Examiner* — Vy T Nguyen
(74) *Attorney, Agent, or Firm* — HARNESS, DICKEY & PIERCE, P.L.C.

(57) ABSTRACT

The present disclosure relates to a system for laser processing of a ceramic electrolyte material. The system may include a controller, a laser responsive to the controller for generating a beam, and a beam forming subsystem. The beam forming subsystem controls a parameter of the beam generated by the laser. The beam forming subsystem further controls the beam to provide a laser fluence sufficient to produce densification of the ceramic electrolyte material.

10 Claims, 3 Drawing Sheets

(56) References Cited

OTHER PUBLICATIONS

X. Huang, Y. Lu, H. Guo, Z. Song, T. Xiu, M.E. Badding, Z. Wen, None-Mother-Powder Method to Prepare Dense Li-Garnet Solid Electrolytes with High Critical Current Density, ACS Applied Energy Materials 1(10) (2018) 5355-5365.

E.Y. Yi, W.M. Wang, J. Kieffer, R.M. Laine, Flame made nanoparticles permit processing of dense, flexible, Li+ conducting ceramic electrolyte thin films of cubic-Li7La3Zr2O12 (c-LLZO), Journal of Materials Chemistry A 4(33) (2016) 12947-12954.

J.Q. Dai, C.P. Yang, C.W. Wang, G. Pastel, L.B. Hu, Interface Engineering for Garnet-Based Solid-State Lithium-Metal Batteries: Materials, Structures, and Characterization, Advanced Materials 30(48) (2018) 1802068.

S.L. Mu, Z.Y. Zhao, J.C. Lei, Y.Z. Hong, T. Hong, D. Jiang, Y. Song, W. Jackson, K.S. Brinkman, F. Peng, H. Xiao, J.H. Tong, Engineering of microstructures of protonic ceramics by a novel rapid laser reactive sintering for ceramic energy conversion devices, Solid State Ionics 320 (2018) 369-377.

F. Abdeljawad, D.S. Bolintineanu, A. Cook, H. Brown-Shaklee, C. DiAntonio, D. Kammler, A. Roach, Sintering processes in direct ink write additive manufacturing: A mesoscopic modeling approach, Acta Materialia https://doi.org/10.1016/j.actamat.2019.01.011 (2019).

M.J. Matthews, G. Guss, D.R. Drachenberg, J.A. Demuth, J.E. Heebner, E.B. Duoss, J.D. Kuntz, C.M. Spadaccini, Diode-based additive manufacturing of metals using an optically-addressable light valve, Optics express 25(10) (2017) 11788-11800.

S.Z. Uddin, L.E. Murr, C.A. Terrazas, P. Morton, D.A. Roberson, R.B. Wicker, Processing and characterization of crack-free aluminum 6061 using high-temperature heating in laser powder bed fusion additive manufacturing, Additive Manufacturing 22 (2018) 405-415.

J.P. Bergmann, M. Bielenin, T. Feustel, Aluminum welding by combining a diode laser with a pulsed Nd:YAG laser, Welding in the World 59(2) (2015) 307-315.

C. Wang et al., A general method to synthesize and sinter bulk ceramics in seconds. *Science* 368, 521-526 (2020).

O. Guillon et al., Field Dassisted sintering technology/spark plasma sintering: mechanisms, materials, and technology developments. *Advanced Engineering Materials* 16, 830-849 (2014).

M. Cologna, B. Rashkova, R. Raj, Flash Sintering of Nanograin Zirconia in< 5 s at 850 C. *Journal of the American Ceramic Society* 93, 3556-3559 (2010).

M. Yu, S. Grasso, R. Mckinnon, T. Saunders, M. J. Reece, Review of flash sintering: materials, mechanisms and modelling. *Advances in Applied Ceramics* 116, 24-60 (2017).

C. Wang et al., A general, highly efficient, high temperature thermal pulse toward high performance solid state electrolyte. *Energy Storage Materials* 17, 234-241 (2019).

Y. Ruan et al., Acid Induced Conversion towards Robust and Lithiophilic Interface for Li—Li7La3Zr2O12 Solid-State Battery. Journal of Materials Chemistry A 7, 14565-14574 (2019).

J. Q. Dai, C. P. Yang, C. W. Wang, G. Pastel, L. B. Hu, Interface Engineering for Garnet-Based Solid-State Lithium-Metal Batteries: Materials, Structures, and Characterization. *Adv Mater* 30, 1802068 (2018).

D.W. McOwen, S. Xu, Y. Gong, Y. Wen, G.L. Godbey, J.E. Gritton, T.R. Hamann, J. Dai, G.T. Hitz, L. Hu, 3D-Printing Electrolytes for Solid-State Batteries, Advanced Materials 30(18) (2018) 1707132.

\* cited by examiner

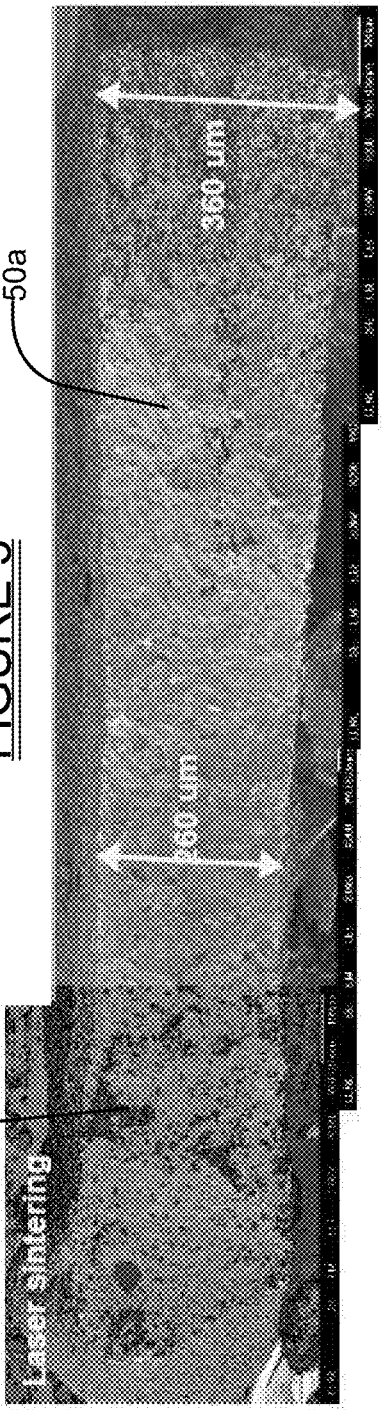
FIGURE 5
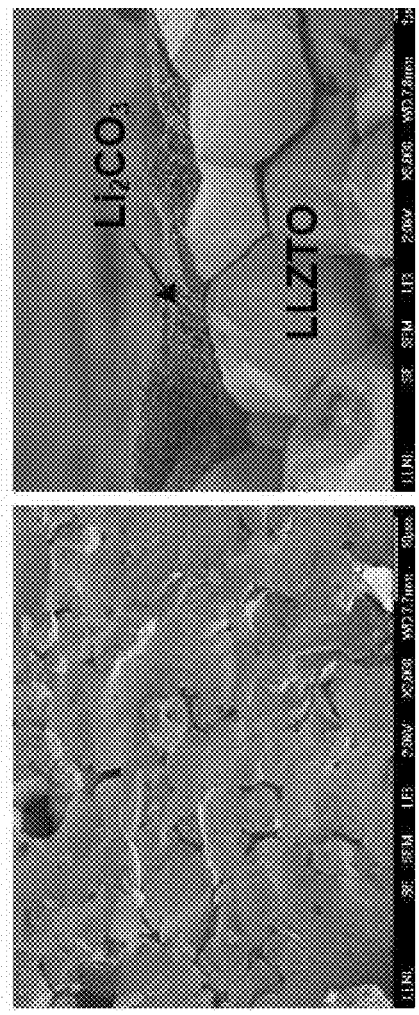
FIGURE 7
FIGURE 6

SYSTEMS AND METHODS FOR LASER PROCESSING OF SOLID-STATE BATTERIES

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to techniques for fabrication of solid-state lithium batteries, and more particularly to systems and methods employing lasers for performing one or more operations on materials used in the construction of solid-state lithium batteries.

BACKGROUND

The statements in this section merely provide background information related to the present disclosure and may not constitute prior art.

Solid superionic conductors such as garnet $Li_7La_3Zr_2O_{12}$ (LLZO) have recently attracted tremendous interest for the fabrication of solid-state lithium batteries (SSLBs) due to their high ionic conductivity, good chemical stability and wide potential window. Successful SSLBs will significantly increase energy density, improve cycling stability, enhance safety, and reduce cost. However, in order to fabricate these batteries, electrolyte processing challenges must first be solved. These challenges include: 1) overcoming inherent brittleness induced manufacturing difficulties; 2) preparation of a highly dense, solid-state electrolyte (SSE) separator to prevent dendrite growth and the crossover of species other than $Li^+$; 3) reducing the thickness of the SSE separator to facilitate $Li^+$ transport and increase energy density; 4) removal of air-exposure induced surface contamination such as nonconductive $Li_2CO_3$, right before integration with anode/cathode materials; 5) increasing critical current density without Li dendrite growth (which can cause a short circuit); and 6) better integration with cathode and anode to enhance contact and avoid interfacial failures.

Current manufacturing methods for SSLBs have limited success in solving the above challenges. The processing of ceramic electrolytes includes preparation of powder pellets or films, sintering and post-processing. Powder pellets can be made by using a hydraulic press, which usually results in mm-thick pellets. Thinner films can be prepared by tape casting. However, such thinner films are typically furnace sintered, which is time and energy intensive, requiring a high temperature (1100° C. to 1300° C.) for several hours to densify LLZO.

Significant Li loss during furnace sintering often causes several issues including non-conductive $La_2Zr_2O_7$ phase formation and inhibition of densification. For example, FIG. 1 shows an example of furnace sintering of a paste PµSL (projection microstereolithography) printed LLZTO film at 1100° C. for six hours, with unsuccessful densification. The inset figure of FIG. 1 shows the damage to the quartz tube of the furnace due to high temperature Li vapor. Furnace sintering can also cause damage to other furnace components such as crucibles and thermocouples. Mother powders and/or an excess amount of Li salts are often required to compensate for the Li loss resulting from the sintering. Even so, it is still difficult to prevent Li loss for films thinner than about 40 µm, the thickness of which is critical to improving energy density. After furnace sintering, the LLZO pellets still need to be mechanically polished to clean off surface contaminants like $Li_2CO_3$ for better contact with metallic lithium. However, mechanical polishing cannot be used for thin films due to the brittleness of the LLZO ceramics.

From the foregoing discussion it will be appreciated that the issues with present day manufacturing operations involving printed or tape casted ceramic electrolyte component, such as poor densification, Li loss, and surface contamination, are significant detriments to producing SSLBs. These issues result in low ionic conductivity, high surface charge resistance and dendrite growth issues that can lead to the failure of solid-state batteries.

Accordingly, new systems and method are needed to address and overcome the above-described manufacturing limitations existing with present day processes for manufacturing SSLBs.

SUMMARY

This section provides a general summary of the disclosure, and is not a comprehensive disclosure of its full scope or all of its features.

In one aspect the present disclosure relates to a system for laser sintering of a ceramic electrolyte material. The system may comprise a controller, a laser responsive to the controller for generating a beam, and a beam forming subsystem for controlling a parameter of the beam generated by the laser. The beam forming subsystem is further controlled such that the beam provides a laser fluence sufficient to produce densification of the ceramic electrolyte material.

In another aspect the present disclosure relates to a system for laser sintering a superionic conductor film material. The system may comprise a controller and a beam forming subsystem responsive to the controller. A continuous wave laser may be included which is responsive to the beam forming subsystem for generating a first laser beam. A pulsed laser may be included which is responsive to the beam forming subsystem for controlling a parameter of the beam generated by the laser. The beam forming subsystem controls the continuous wave laser and the pulsed laser to both sinter the ceramic electrolyte material and to remove a portion of surface material from the ceramic electrolyte material.

In still another aspect the present disclosure relates to a method for laser sintering of a ceramic electrolyte material. The method may comprise generating a laser beam, and moving at least one of the ceramic electrolyte material or the laser beam over the ceramic electrolyte material while the laser beam irradiates a surface of the ceramic electrolyte material. The method may further include controlling at least one parameter of the laser beam to cause sintering and densification of the ceramic electrolyte material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. In the drawings:

FIG. 5 is a highly enlarged image showing portions of an LLZO green film before and after laser sintering, to highlight the significant reduction in thickness of the LLZO green film;

FIG. 6 is a highly enlarged image showing a portion of the densified material region of FIG. 5 illustrating the significant reduction in pores in the thickness of the material after laser sintering; and FIG. 7 is a highly enlarged image showing the surface of the LLZO green film after the sintering operation, illustrating that $Li_2CO_3$ is still present on the surface but can be removed by laser ablation.

DETAILED DESCRIPTION

Example embodiments will now be described more fully with reference to the accompanying drawings.

The present disclosure relates to various new advanced laser processing techniques to address and overcome the fabrication difficulties of LLZO and related ceramic materials. Broadly speaking, these techniques relate to advanced processing techniques involving laser sintering and laser ablation. Preliminary results show that laser sintering with localized heating and a rapid processing time can mitigate Li loss and accelerate densification of a material (e.g., film). At the same time, laser ablation can remove surface contamination and can be used to engineer the surface topology of a film to enhance contact between the solid electrolyte and electrode. The laser processing techniques described herein significantly help the integration of solid-state batteries to achieve optimal performance.

Figure 2:
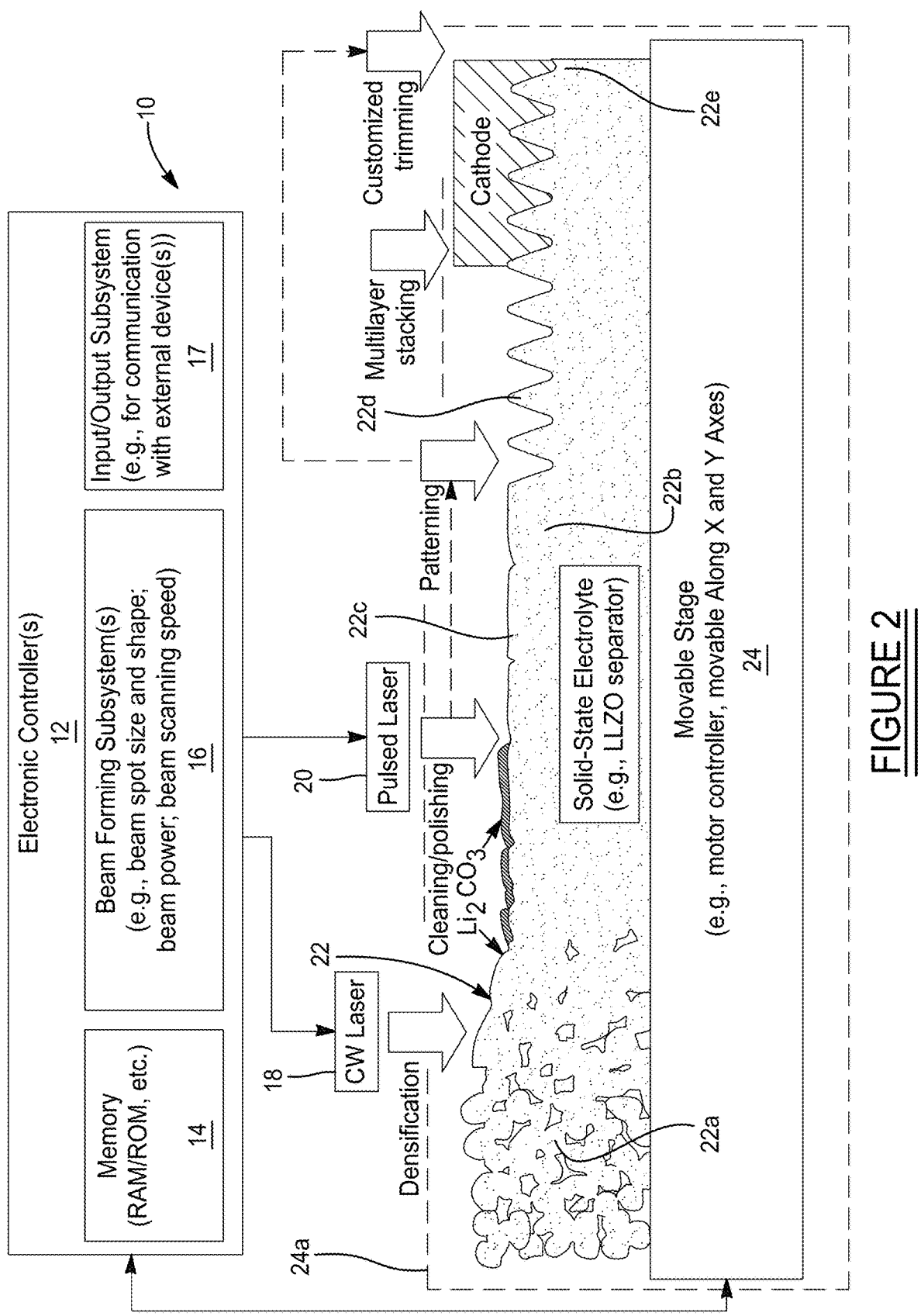
FIG. 2 is a high level schematic diagram of one embodiment of a laser processing system in accordance with the present disclosure, and with the system shown operating on a section of solid state electrolyte (SSE) (shown in highly enlarged, cross-sectional side view schematic fashion) to perform densification, cleaning/polishing, patterning of the surface, and customized trimming.

Referring to FIG. 2, a laser processing system 10 is shown in accordance with one embodiment of the present disclosure. The laser processing system performed by the laser processing system 10 can be operated in air or inert gas (N2, Ar, etc.) environment. The system 10 in this example may include an electronic controller 12 which may be comprised of a single controller or two or more electronic controllers. The electronic controller 12 may include one or more memories 14 which may comprise RAM, ROM or virtually any other memory. In one embodiment the memory 14 comprises a non-volatile memory. At least one beam forming subsystem 16 may be included as part of the electronic controller 12. Alternatively, the beam forming subsystem 16 may form a separate, standalone subsystem in communication with the electronic controller 12. The beam forming subsystem 16 may be used to provide real time power level control over the output of one or both of a continuous wave (CW) laser 18 and/or a pulsed laser 20. Optionally, separate beam forming subsystems may be used to separately control the CW laser 18 and the pulsed laser 20. One or both of the lasers 18 or 20 may be diode lasers. The beam forming subsystem(s) 16 may also provide control over the beam spot position. Control over the beam spot position may be advantageous when a galvo mirror is used to steer the beam on a fixed sample, rather than moving the sample by using a movable stage. The beam spot size, beam spot shape, beam pulse width and/or beam pulse duration, beam spatial distribution, ramping of the beam power, control of the beam power to achieve controlled heating and cooling, beam pulse repetition frequency, beam scanning speed, may all be controlled with one or the other of the lasers 18 and 20. The beam forming subsystem 16 may also use optical shaping elements, such as an optically addressable light valve, a spatial light modulator, and/or diffractive or refractive elements, and computer designs to define the shape of the laser pattern to make customized battery components. Optionally, an input/output subsystem 17 (e.g., RS-232; RS-422, parallel, USB, Ethernet, etc.) may be used to enable the system 10 to communicate with remote components such as display systems, desktop or laptop computers, etc. The CW laser 18 and/or the pulsed laser 20 may be used to perform operations including laser sintering, and/or laser ablating, and/or laser patterning and/or laser trimming on a ceramic electrolyte material, in this example a solid state electrolyte (SSE) in the form of a LLZO film 22. The LLZO film 22 may be supported on a movable stage 24 controlled for movement by the controller 12 (or a separate controller, not shown). Alternatively, the LLZO film 22 may be fixedly supported for non-movement and the laser CW laser 18 and/or the pulsed laser 20 may be moved by a suitable movement control system (not shown) controlled either by the controller 12 or by a separate controller (not shown). Optionally, a chamber 24a may be used to house at least the LLZO film 22, and optionally the entire movable stage 24 with the LLZO film supported thereon, such as when an inert gas is being used during the laser processing.

Figure 1:
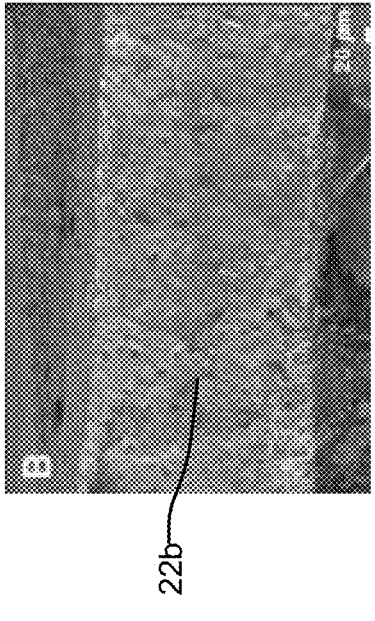
FIG. 1 is a highly magnified image which shows an example of a prior art furnace sintering operation of a paste PμSL (projection micro stereolithography) printed LLZTO film at 1100° C. for six hours, with resulting unsuccessful densification; the inset figure of FIG. 1 shows the damage to the quartz tube of the furnace due to high temperature Li vapor.

In particular, the laser processing system 10 is able to provide highly localized heating to produce a high temperature at narrowly focused locations during a localized heating operation. Importantly, the system 10 requires no direct contact with the material/substrate being heated. The system 10 also provides extremely fast processing, and further provides the designer with the ability to tailor use of the lasers 18 and/or 20 by selecting various laser parameters. High temperature and fast heating can minimize Li loss and promote densification (as discussed above with respect to FIG. 1). The use of a laser beam also provides non-contact, localized heating, which prevents contamination of the sample and damage to the heating elements used in conventional furnaces.

Figure 3:
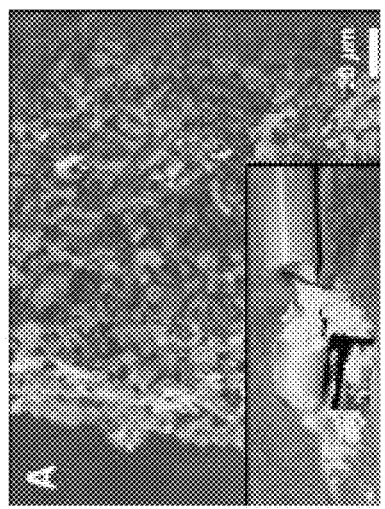
FIG. 3 is a highly magnified image which shows how laser sintering using the system of FIG. 2 for only 20 seconds leads to high density of a Paste PμSL printed LLZTO film.

FIG. 2 shows the system 10 operating on a ceramic electrolyte material, in this example an SSE film 22. The SSE film 22 has an initial section, indicated by reference number 22a, which is in its initial condition before any processing is performed using the system 10. In this example the CW laser 18 of the system 10 is controlled to densify the SSE film 22 to produce a densified film, as indicated by portion 22b in FIG. 2. The densified portion 22b is also shown in the highly enlarged image of FIG. 3.

Figure 4:
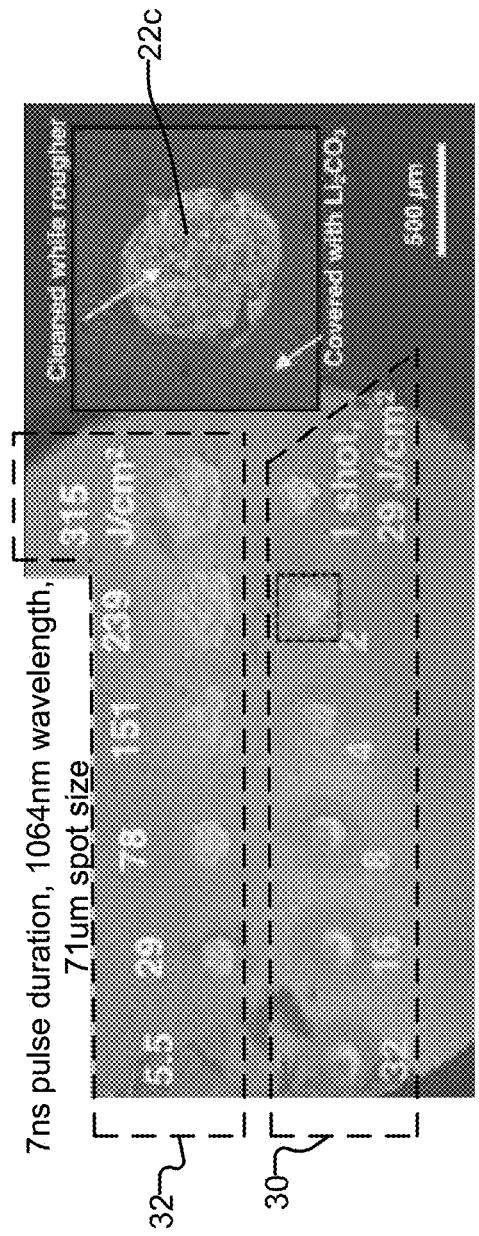
FIG. 4 is a highly enlarged image showing how laser ablation, using the system of FIG. 2, cleans up a $Li_2CO_3$ surface layer and can also form a patterned structure.

FIG. 2 also shows the pulsed laser 20 being used to perform cleaning and/or polishing on an upper surface 22c of the SSE film 22 to ablate material that one wishes to remove from the SSE film. For example, the pulse laser 20 is shown being used to ablate a $Li_2CO_3$ layer of material on the upper surface 22c, which reduces the charge transfer resistance and improves wetting with metallic lithium. FIG. 4, in the inset figure, also shows a highly enlarged image illustrating the surface 22c of the SSE film 22, along with a portion of the surface of the SSE film which has not been cleaned. FIG. 4 also shows the results of various laser ablation parameters (within dashed line 30). The size of the ablation zone can be seen for 1, 2, 4, 8, 16 and 32 shots with a laser fluence of 29 $J/cm^2$. By applying more pulses, the ablation depth can be controlled from <1 micrometer up to tens of micrometers. Dashed line 32 shows examples of the size of the ablation zone created when applying beam fluences of 5.5 $J/cm^2$-315 $J/cm^2$ at a single shot. By controlling the fluence, the ablation area can be controlled. An ablation threshold of ~5.5 $J/cm^2$ is found for the LLZO material.

FIG. 2 also shows the pulsed laser 20 being used to pattern an upper surface 22d of the SSE film 22. Laser polishing and patterning can introduce controlled surface morphologies of an LLZO separator, which will benefit both the strength and the electromechanical charge transfer characteristics of the LLZO separator along the electrode-electrolyte interface. Laser polishing and patterning can also help significantly to prevent lithium deposition induced crack growth in the LLZO separator.

It will also be appreciated that laser surface treatments can readily be conducted on 3D architected separators prepared by other additive manufacturing techniques, which extends the utility of the system 10. Still further, layer-by-layer sintering using the system 10 during an additive manufacturing process allows fabrication of complex 3D structures and the integration of different materials. The use of an extremely short duration laser (e.g., femtosecond pulsed laser) with the system 10 enables the system 10 to machine highly customized battery shapes. In this regard, FIG. 2 also shows the system 10 being used to perform customized trimming of the SSE film 22 at 22e subsequent to a cathode material being deposited on the patterned surface 22d. It will also be appreciated that the system 10 enables layer-by-layer stacking of anode/separator/cathode materials for a full battery integration/manufacturing process.

The laser processing system 10 was used by the co-inventors during experiments to sinter a LLZO green film 50. The laser system was a diode laser system previously developed at LLNL. The LLZO green film 50 was a porous LLZO film. After irradiating with a continuous wavelength laser with suitable power density for a certain period, the LLZO green film 50 was heated up to a critical temperature and started to densify. The LLZO green film 50 was densified within only 20 seconds from about 360 μm to about 260 μm, as indicated in FIG. 5 (portion 50a). This resulted in a 28% thickness reduction of the LLZO green film 50. FIG. 6 shows an enlarged illustration of a portion of the material 50a illustrating the significant removal of pores. FIG. 7 shows that the surface of the LLZO green film 50 is still covered with Li2CO3 after the laser sintering. In comparison, sintering in a tube furnace at 1100 degrees C. for 6 hours did not accomplish satisfactory densification. As one skilled in this art will appreciate, different types of laser systems can be used for this purpose. With proper tuning of the laser wavelength, beam spot size, laser scan strategy, scan speed, power density, and LLZO film compositions and structures (LLZO particle size, packaging density, sintering agent, etc.), the shrinkage, density, composition, phase, and other microstructures of the final LLZO film can be adjusted.

Besides LLZO material, the laser sintering can also be used for other ceramic materials, such as other lithium or sodium superionic conductors. The benefits of laser sintering with the system 10 for these superionic conductors are fast sintering, the ability to scale the system 10 to meet the needs of a given dimension of material being sintered, and the ability to eliminate the Li loss and densification issues present with conventional furnace sintering.

The system 10 thus overcomes and eliminates the drawbacks present with present day furnace sintering operations that are not well suited to sintering and performing other operations on solid superionic conductors such as LLZO. The system 10 enables much more effective and time efficient sintering to be performed on LLZO, as well as highly controlled laser ablation of surface portions of LLZO, laser surface patterning of the surface of an LLZO material, as well as laser trimming. This means that all, or virtually all, of the operations that may need to be performed on an LLZO material can be performed with a laser-based system, thus reducing the need to move the LLZO material to different material processing stations, while optimizing the resulting, processed LLZO material for use in solid-state lithium ion batteries.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for laser sintering of a ceramic electrolyte material forming a green body, the system comprising:
   a controller;
   a laser responsive to the controller for generating a beam;
   a beam forming subsystem for controlling a parameter of the beam generated by the laser; and
   wherein the beam forming subsystem is further controlled such that the beam provides a laser fluence selected to act on a full thickness of the ceramic electrolyte material forming the green body, to simultaneously both sinter and densify the full thickness of the ceramic electrolyte material forming the green body in a single laser processing operation, wherein the full thickness of the ceramic electrolyte material forming the green body is densified such that the full thickness of the ceramic electrolyte material forming the green body reduces from a thickness of greater than 260 μm down to a thickness of 260 μm, and wherein the ceramic electrolyte material forming the green body includes a garnet Li7LasZr2O12 (LLZO) material in one of powder, pellet or tape form.

2. The system of claim 1, wherein the laser comprises a continuous wave laser.

3. The system of claim 1, wherein the laser comprises a pulsed laser.

4. The system of claim 1, wherein the parameter of the beam includes at least one of:
   beam spot size;
   power level;
   beam pulse duration;
   beam pulse repetition rate; or
   laser fluence generated.

5. The system of claim 1, wherein the beam forming subsystem and the laser are further configured to perform an ablation operation to ablate a portion of material on a surface of the ceramic electrolyte material.

6. The system of claim 1, wherein the beam forming subsystem and the laser are further configured to perform patterning of a surface of the ceramic electrolyte material.

7. The system of claim 1, wherein the beam forming subsystem and the laser are further configured to perform laser trimming of at least a portion of the ceramic electrolyte material.

8. The system of claim 3, wherein the pulsed laser is configured to perform an ablation operation to remove a portion of surface material from the ceramic electrolyte material.

9. The system of claim 1, wherein at least one of the beam forming subsystem or the laser is configured to control at least one of the following parameters:
   beam spot size;
   power level;
   beam pulse duration;
   beam pulse repetition rate;
   laser fluence generated; or
   beam spatial distribution.

10. A system for laser sintering of a ceramic electrolyte material forming a green body, the system comprising:
    a controller;
    a laser responsive to the controller for generating a beam;
    a beam forming subsystem for controlling a parameter of the beam generated by the laser; and
    wherein the beam forming subsystem is further controlled such that the beam provides a laser fluence selected to act on a full thickness of the ceramic electrolyte material forming the green body, to simultaneously both sinter and densify the full thickness of the ceramic electrolyte material forming the green body in a single laser processing operation, wherein the full thickness of the ceramic electrolyte material forming the green body is densified such that the full thickness of the ceramic electrolyte material forming the green body reduces by up to 28% while performing the single laser processing operation for about 20 seconds, and wherein the ceramic electrolyte material forming the green body includes a garnet Li7LasZr2O12 (LLZO) material in one of powder, pellet or tape form.

* * * * *